(12) United States Patent
Hsu

(10) Patent No.: US 7,737,387 B2
(45) Date of Patent: Jun. 15, 2010

(54) METHOD FOR SHUTTING OFF PROJECTOR INCLUDING TURNING OFF THE LIGHT SOURCE AND THE FAN AFTER THE PROJECTOR RECEIVING A SECOND SHUT DOWN COMMAND

(75) Inventor: Nien-Hui Hsu, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 493 days.

(21) Appl. No.: 11/761,382

(22) Filed: Jun. 12, 2007

(65) Prior Publication Data
US 2008/0030689 A1    Feb. 7, 2008

(30) Foreign Application Priority Data
Aug. 2, 2006  (TW) .............................. 95128254 A

(51) Int. Cl.
*G01J 1/32* (2006.01)
(52) U.S. Cl. ....................................... 250/205; 250/221

(58) Field of Classification Search ................. 250/205, 250/214 LS, 221; 353/52, 57, 79, 85–87, 353/119; 348/748; 359/512
See application file for complete search history.

(56) References Cited

U.S. PATENT DOCUMENTS
6,588,907 B1 * 7/2003 Billington et al. ............. 353/57

FOREIGN PATENT DOCUMENTS
JP          200549464       2/2005

* cited by examiner

*Primary Examiner*—Que T Le
(74) *Attorney, Agent, or Firm*—Jianq Chyun IP Office

(57) ABSTRACT

A method for shutting off a projector having a fan and a light source is provided. The method includes the following steps. The power of the light source is reduced from a first power to a second power and the speed of the fan is increased from a first speed to a second speed after the projector receiving a first command. Then, a process is executed for shutting off the light source and the fan after the projector receiving a second command. The above-mentioned method is capable of not only preventing the projector from damage result from over-shooting, but also shortening the time needed to shut off the projector.

12 Claims, 5 Drawing Sheets

METHOD FOR SHUTTING OFF PROJECTOR INCLUDING TURNING OFF THE LIGHT SOURCE AND THE FAN AFTER THE PROJECTOR RECEIVING A SECOND SHUT DOWN COMMAND

CROSS-REFERENCE TO RELATED APPLICATION

This application claims the priority benefit of Taiwan application Ser. No. 95128254, filed Aug. 2, 2006. All disclosure of the Taiwan application is incorporated herein by reference.

BACKGROUND OF THE INVENTION

1. Field of the Invention

The present invention relates to a method for shutting off a projector having a fan and a light source. More particularly, the present invention relates to a method capable of shortening time needed to shut off a projector without affecting lifetime of the projector.

2. Description of Related Art

In order to provide dynamic image with high brightness and high contrast ratio, high power light sources are utilized in conventional projectors. With the increase in power of the light source, heat generated in the projectors may increase. Therefore, cooling fans are usually utilized to lower the temperature of the projector, so as to prevent the operating temperature of the projector from being too high. Aside from maintaining the operating temperature of projectors during projection, the cooling fans also play an important role in shutting off projectors.

When a projector is shut off, light sources and fans thereof may be turned off immediately. When the fans are turned off immediately, the heat dissipating condition is worse than that during normal operation since the residue heat in the projector still exits. Therefore, the temperature of the projector may arise to higher than the operating temperature and then cool down to room temperature. The temperature variation is generally called "over-shooting". The light source and other electronic devices of the projector may be damaged and the lifetime of the projector may be reduced because of the "over-shooting" phenomenon.

As shown in FIG. 1, when a projector is turned on (t1), a light source and a cooling fan may be turned on simultaneously and run continuously for a period of time. When the projector is shut off, the light source is turned off first (t2) and the cooling fan may run continuously in a period of time (from t2 to t3) so as to dissipate heat in the projector (so-called cooling mode). Generally, the cooling mode continues about 1-2 minutes (from t2 to t3) such that the light source is cooled down to a temperature lower than the re-lighting temperature and the projector is capable of being turned on again. Then, the power source can be disconnected by user and the projector can be stored immediately. The re-lighting temperature described herein is defined as a minimum temperature which ensures that the light source can be restarted. In the cooling mode mentioned above, user can not disconnect the power source until the light source is cooled down by the cooling fan completely such that the time needed to shut off a projector is too long for a user, who may want to store the project rapidly after clicking the shut down button, to be satisfied.

SUMMARY OF THE INVENTION

The present invention is directed to a method for shutting off a projector. The method is capable of shortening the time needed for shutting off the projector without damaging electronic devices and fan(s) therein.

As embodied and broadly described herein, an embodiment of the present invention disclose: after the projector receiving a first shut down command, the power of the light source of the projector is lowered from a first power to a second power and the speed of the fan of the projector is increased from a first speed to a second speed; and thereafter, after the projector receiving a second shut down command, a process is executed for shutting off the light source and the fan.

An embodiment of the present invention disclose: the power of the light source is lowered from a first power to a second power or the speed of the fan is increased from a first speed to a second speed after the projector receiving a first shut down command; and thereafter, after the projector receiving a second shut down command, a process is executed for shutting off the light source and the fan.

Since the power of the light source is lowered from the first power to the second power and/or the speed of the fan is increased from the first speed to the second speed during a period between the projector receiving the first shut down command and the second shut down command, the projector can be pre-cooled before receiving the second shut down command. Additionally, the temperature of the projector in an embodiment is merely lowered down to a reference between the re-lighting temperature and the operating temperature of the light source. Specifically, it is not necessary to lower the temperature of the projector to below the relighting temperature. Therefore, the time needed to shut off the projector is shortened effectively and the requirement of rapid storing after disconnecting the power source is satisfied.

Various specific embodiments of the present invention are disclosed below, illustrating examples of various possible implementations of the concepts of the present invention. The following description is made for the purpose of illustrating the general principles of the invention and should not be taken in a limiting sense. The scope of the invention is best determined by reference to the appended claims.

Other objectives, features and advantages of the present invention will be further understood from the further technology features disclosed by the embodiments of the present invention wherein there are shown and described preferred embodiments of this invention, simply by way of illustration of modes best suited to carry out the invention.

DESCRIPTION OF EMBODIMENTS

First Embodiment

In order to shorten the time needed to shut off the projector and satisfy the requirement of rapid storing the projector after the shut down button thereof is clicked, a method for shutting off a projector is provided and various embodiments are illustrated hereinafter.

A method for shutting off a projector is adapted to a projector having at least one fan and light source. The method can be executed via the software and firmware installed in the projector. Additionally, the temperature of the projector according to an embodiment is merely lowered down to a reference temperature between the re-lighting temperature and the operating temperature. Specifically, it is not necessary to lower the temperature of the projector to below the re-lighting temperature. Therefore, the time needed to shut off the projector is shortened effectively and the requirement of rapid storing a projector after the shut down button thereof is clicked is satisfied.

Figure 1:
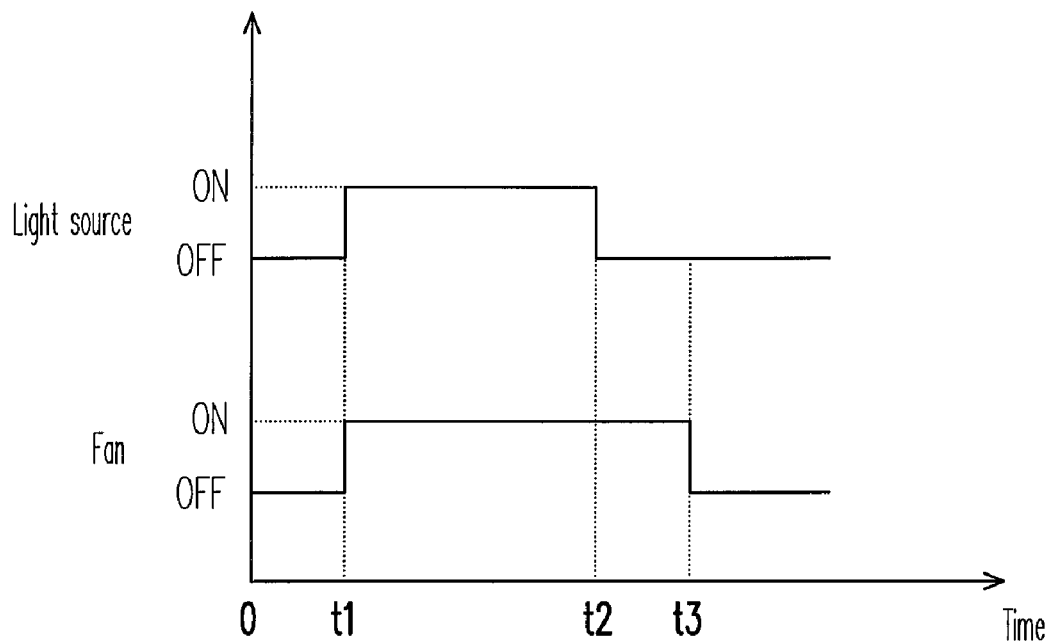
FIG. 1 shows a diagram illustrating the status of the light source and the fan according to prior art.
Figure 2:
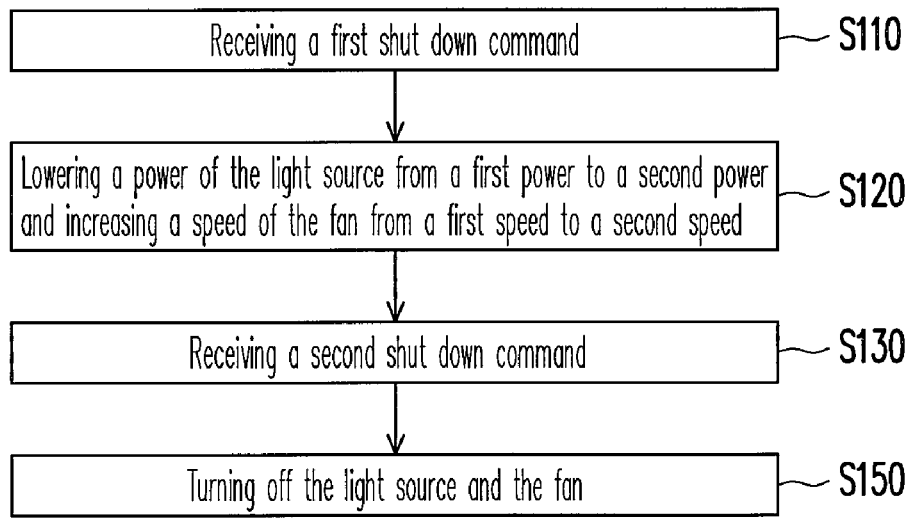
FIG. 2 schematically shows a flow chart illustrating the method for shutting off a projector according to the first embodiment of the present invention.
Figure 3:
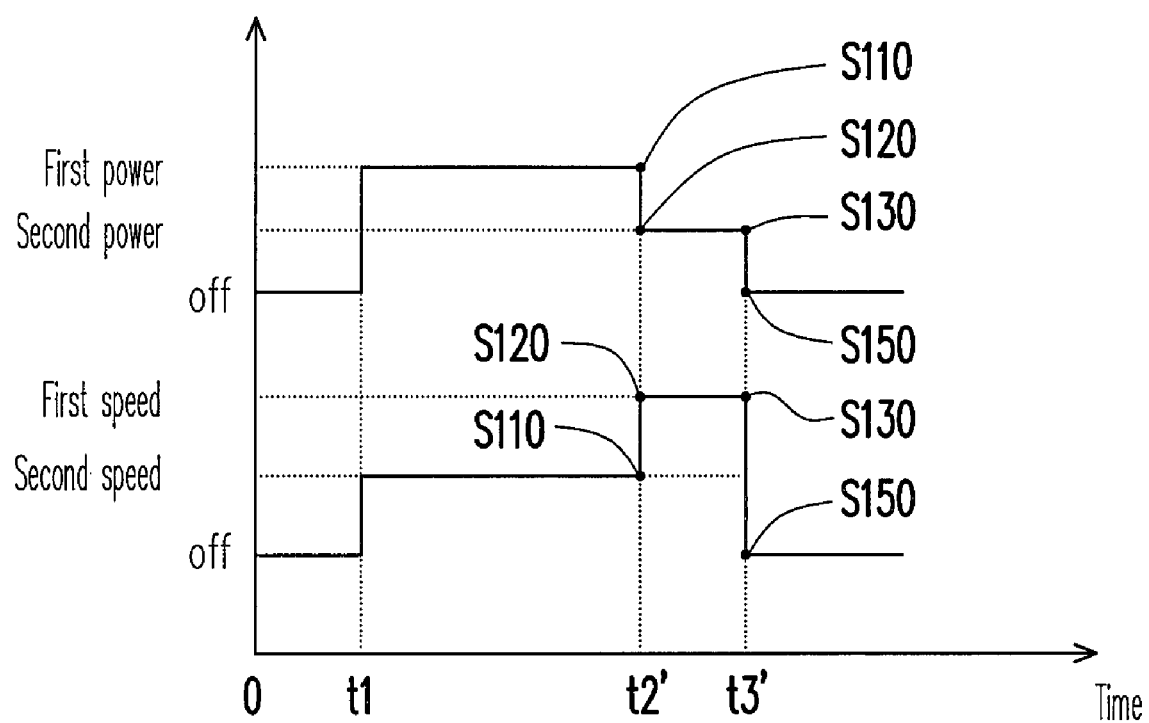
FIG. 3 shows a diagram illustrating the status of the light source and the fan according to the first embodiment of the present invention.

FIG. 2 schematically shows a flow chart illustrating the method for shutting off a projector according to the first embodiment of the present invention. FIG. 3 shows a diagram illustrating the status of the light source and the fan according to the first embodiment of the present invention. As shown in FIG. 2 and FIG. 3, when a projector is turned on (t1), a light source and a fan may be turned on simultaneously and run continuously for a period of time. When user clicks the shut down button on the projector or the remote controller, the projector receives a first shut down command (S110). After receiving the first shut down command (S110), the projector operates in a cooling mode (i.e. from t2' to t3').

When the projector operates in the cooling mode, the power of the light source thereof is lowered from a first power to a second power and the speed of the fan is increased from a first speed to a second speed (S120). For example, the power of the light source may be lowered from a power corresponding to a high brightness mode (a Video mode) to another power corresponding to a low brightness mode (an Eco mode). Additionally, the speed of the fan may be increased from a normal speed (i.e. a first speed) to a maximum speed (i.e. a second speed). The adjustment regarding to power of the light source and speed of the fan may be modified in accordance with specifications of the projector.

Take a light source with power of 200 W as an example, the power of the light source is about 200 W under the high brightness mode and the power of the light source is about 150 W under the Eco mode. Meanwhile, the voltage applied to the fan operating in the normal speed is 8V, the voltage applied to the fan operating in the maximum speed is 12V, and the airflow of the fan operating in the maximum speed is twice as large as the airflow of the fan operating in the normal speed. The following equation is derived from the equation $\dot{Q}=\rho \times C_p \dot{V} \Delta T$, wherein $\dot{Q}$ represents dissipated energy, $\dot{V}$ represents airflow, $\rho$ represents density, $C_P$ represents specific heat, and $\Delta T$ represents temperature variation of projector.

$$\dot{Q}_{200\,W} = \rho \times C_P \dot{V}_{8V} \Delta T_1 \quad \text{(Equation 1)}$$

$$\dot{Q}_{150\,W} = \rho \times C_P \dot{V}_{12V} \Delta T_2 \quad \text{(Equation 2)}$$

$$\dot{Q}_{200W} = \frac{200}{150} \dot{Q}_{150W} \quad \text{(Equation 3)}$$

$$\dot{V}_{12V} = 2 \dot{V}_{8V} \quad \text{(Equation 4)}$$

In the above-mentioned equations, $\dot{Q}_{200\,W}$ and $\dot{Q}_{150\,W}$ represent dissipated energies of the light source with power of 200 W operating under the high brightness mode and the Eco mode, respectively.

$\dot{V}_{8V}$ and $\dot{V}_{12V}$ represent air flows of the fan operating in the normal speed and in the maximum speed, respectively. $\Delta T_1$ and $\Delta T_2$ represent temperature variations of the light source with power of 200 W in the high brightness mode and the Eco mode, respectively. After (Equation 2), (Equation 3) and (Equation 4) is substituted into (Equation 1), another equation (Equation 5) is obtained.

$$\Delta T_2 = \frac{3}{8} \Delta T_1 \quad \text{(Equation 5)}$$

In accordance with (Equation 5), during a period after receiving the first shut down command before receiving a second shut down command, the temperature variation of the projector in the eco mode is ⅜ times that of the projector in the high brightness mode.

After receiving the first shut down command (S110), the projector may lower the power of the light source from a first power to a second power first and then increase the speed of the fan form a first speed to a second speed sequentially. Or the projector may increase the speed of the fan form the first speed to the second speed and then lower the power of the light source from the first power to the second power sequentially. However, the projector may lower the power of the light source from the first power to the second power and increase the speed of the fan form the first speed to the second speed simultaneously, such that the temperature of the projector can be lowered more rapidly.

After receiving the first shut down command (S110), the projector usually projects an image which requests user to confirm, such that the projector is not shut off even though user clicks the shut down button on the projector or the remote controller accidentally. When user clicks the shut down button on the projector or the remote controller again after the image which requests user to confirm is projected by the projector, a second shut down command is received by the projector (S130). After the projector receiving the second shut down command (S130), the light source and the fans are turned off. Therefore, the projector is not shut off accidentally through confirming whether the second shut down command is received by the projector.

Figure 4:
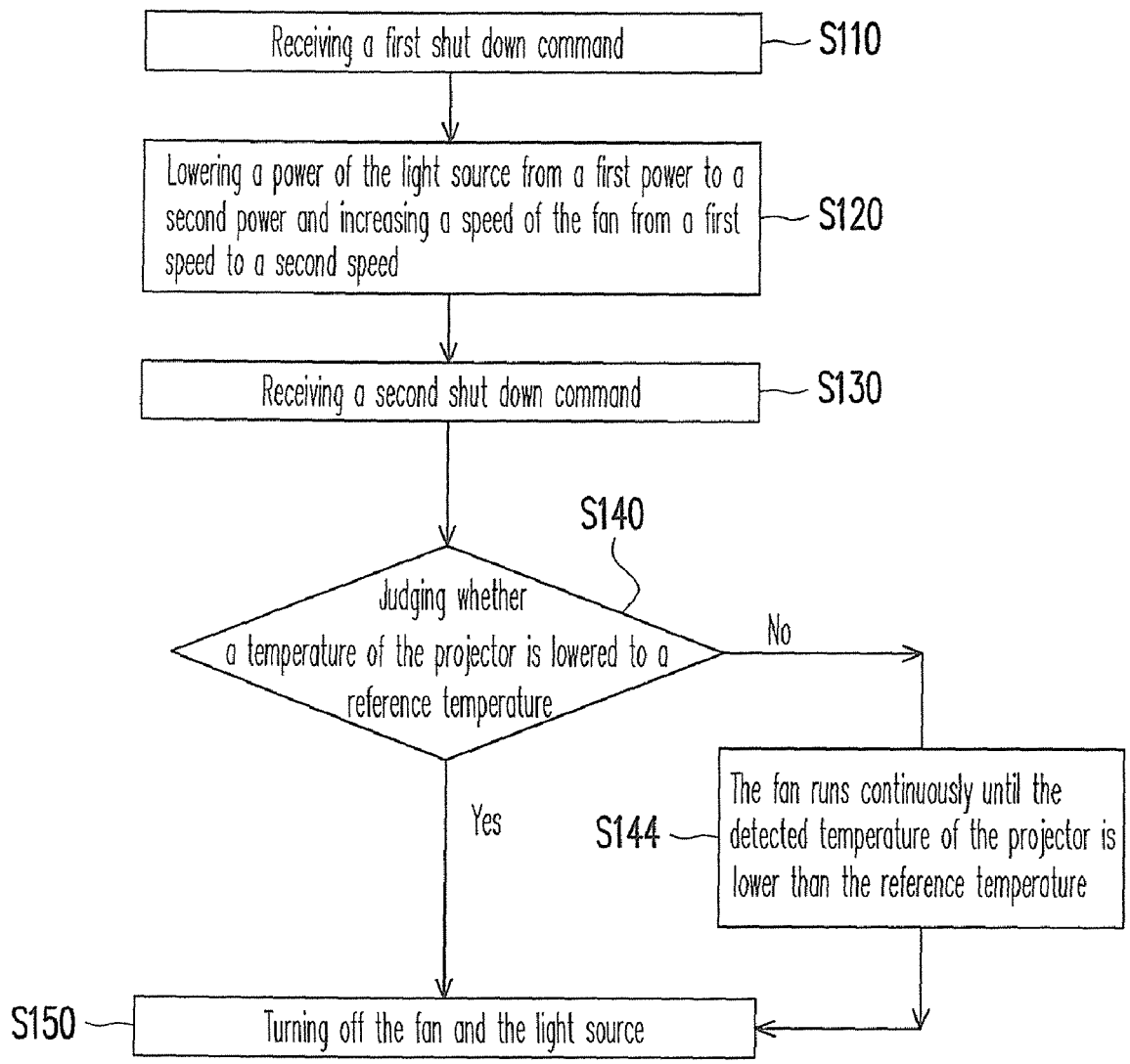
FIG. 4 schematically shows another flow chart illustrating the method for shutting off a projector according to the first embodiment of the present invention.

As shown in FIG. 4, after the projector receiving the second shut down command (S130), the temperature of the projector is detected so as to judge whether the temperature of the projector is lower than a reference temperature (S140). If the detected temperature of the projector is higher than the reference temperature, the fan runs continuously until the detected temperature of the projector is lower than the reference temperature (S144) and the fan and the light source is then turned off (S150) to complete the shut down procedure. If the detected temperature of the projector is already lower than the reference temperature, the fan and the light source is turned off directly (S150). In another aspect, after the projector receiving the second shut down command (S130), the fan and the light source may run continuously for a shut down period predetermined by the projector, and then, the fan and the light source is turned off.

In the embodiment of the present invention, the reference temperature is between the re-lighting temperature and the operating temperature, for example. Generally, the reference temperature is about 2-5 degrees Celsius lower than the operating temperature. It is noted that, the temperature of the projector may arise first and then cool down gradually (so-called over-shooting) after the light source is turned off. In the embodiment of the present invention, due to the over-shooting, the reference temperature is set to be about 2-5 degrees Celsius lower than the operating temperature, such that the light source and other electronic devices of the projector may be prevented from damaging and the lifetime of the projector may increase.

Second Embodiment

Figure 5:
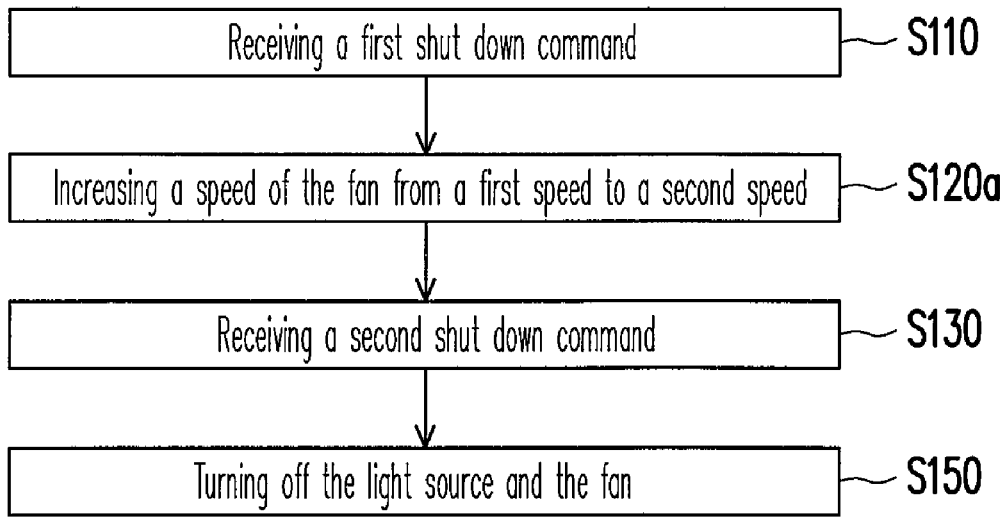
FIG. 5 schematically shows a flow chart illustrating the method for shutting off a projector according to the second embodiment of the present invention.

FIG. 5 schematically shows a flow chart illustrating the method for shutting off a projector according to the second embodiment of the present invention. The shut off method of this embodiment is similar to that of the first embodiment except that the step (S120a) performed during a period between receiving the first shut down command (S110) and receiving the second shut down command (S130) is different from the step (S120) described in the first embodiment. Specifically, in the step (S120a) of this embodiment, only the speed of the fan is increased from the first speed to the second speed, but the power of the light source is not reduced. The method of the embodiment can reduce the time needed to shut off the projector because of the increased airflow provided by the fan operating in higher speed, even though the power of the light source is not reduced.

Third Embodiment

Figure 6:
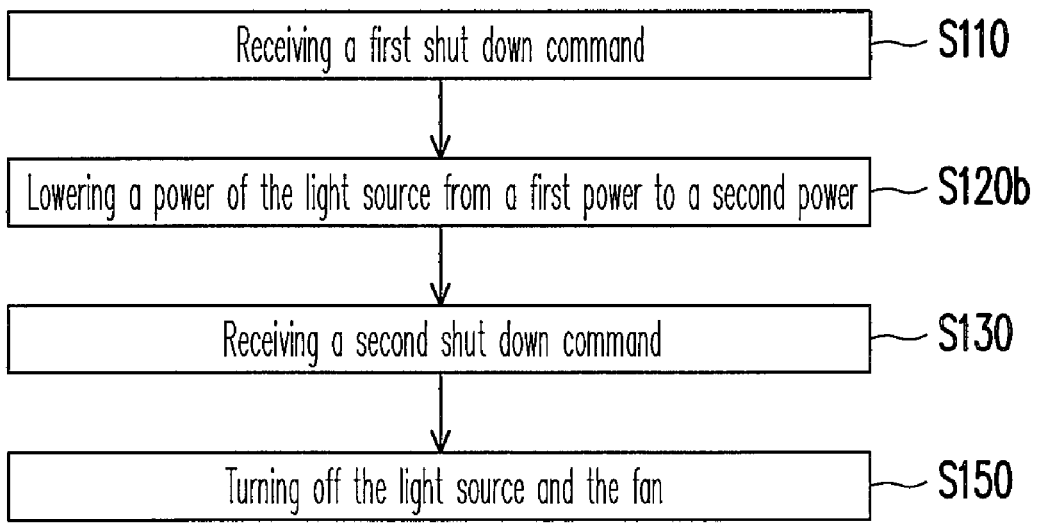
FIG. 6 schematically shows a flow chart illustrating the method for shutting off a projector according to the third embodiment of the present invention.

FIG. 6 schematically shows a flow chart illustrating the method for shutting off a projector according to the third embodiment of the present invention. The shut off method of this embodiment is similar to that of the second embodiment except that the step (S120b) performed during a period between receiving the first shut down command (S110) and receiving the second shut down command (S130) is different from the step (S120a) described in the second embodiment. Specifically, in the step (S120b) of this embodiment, only the power of the light source is reduced, but the speed of the fan is not increased from the first speed to the second speed. Since the power of the light source and the heat generated from the light source is reduced, the temperature of the projector can be lowered and the time needed to shut off the projector can be reduced without increasing the speed of the fan.

The Fourth Embodiment

Figure 7:
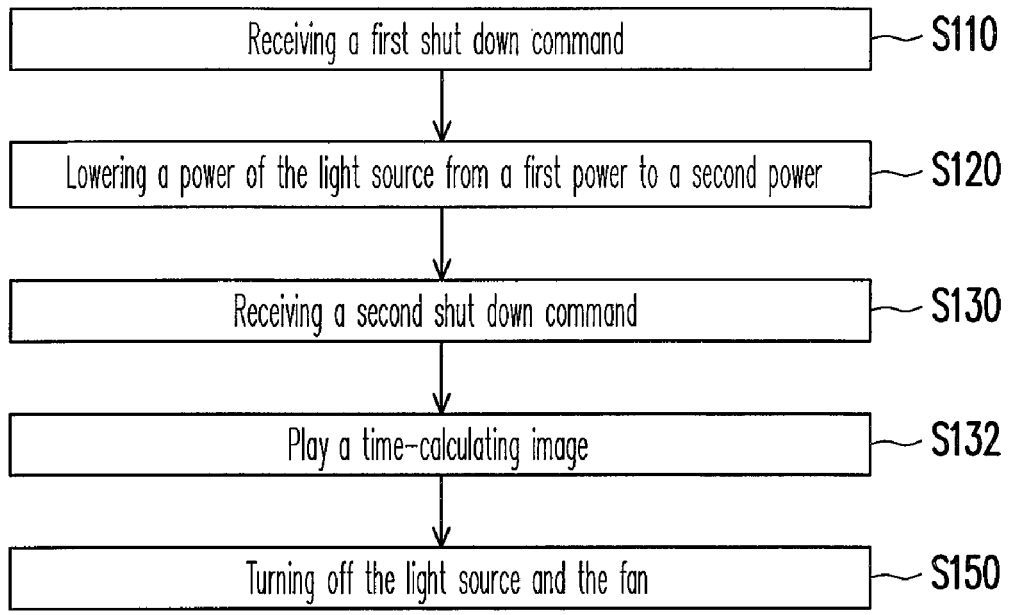
FIG. 7 schematically shows a flow chart illustrating the method for shutting off a projector according to the fourth embodiment of the present invention.

FIG. 7 schematically shows a flow chart illustrating the method for shutting off a projector according to the fourth embodiment of the present invention. As shown in FIG. 7, the shut off method of this embodiment is similar to that of the first embodiment (shown in FIG. 2) except that a time-calculating image is projected through the projector (S132) after the projector receiving the second shut down command (S130). Specifically, the projector of the present invention may not be shut off rapidly after receiving the first shut down command. Instead, the projector may shut down after receiving the second shut down command. In this embodiment, the time-calculating image may be shown through an OSD (On Screen Display) on the projector after the projector receiving the second shut down command, such that user is aware of the time needed for shutting off the projector. The time-calculating image, such as countdown image, shows the estimation time needed for shutting off the projector.

Figure 8:
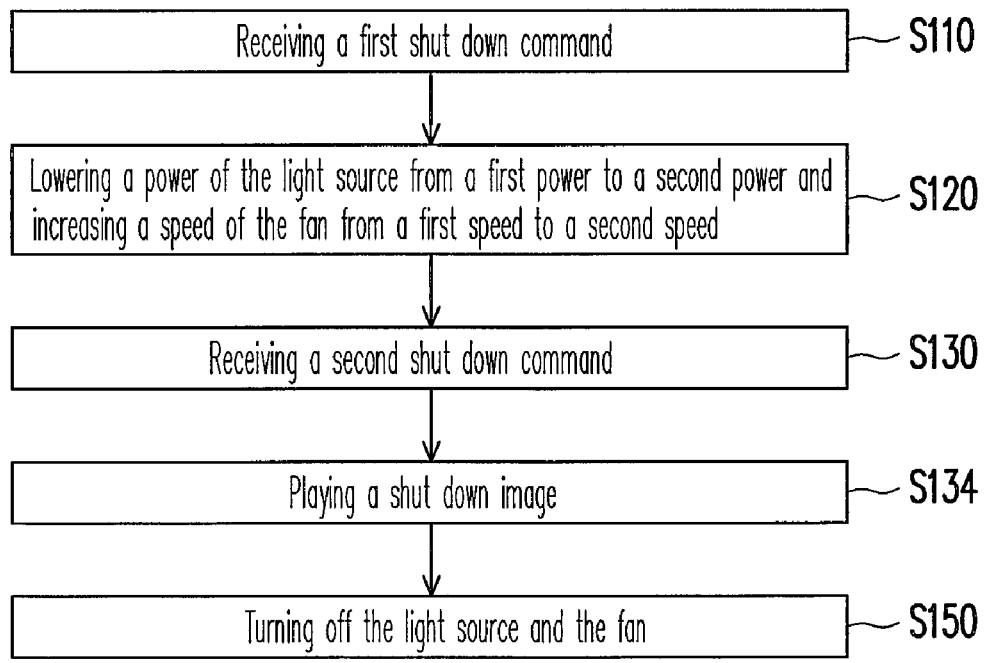
FIG. 8 schematically shows another flow chart illustrating the method for shutting off a projector according to the fourth embodiment of the present invention.

FIG. 8 schematically shows another flow chart illustrating the method for shutting off a projector according to the fourth embodiment of the present invention. Referring to FIG. 8, in order to notify user that the projector is executing the shut off procedure, a shut down image may be played through the projector after the projector receiving the second shut down command. The shut down image may be a static or a dynamic image capable of notifying user that the projector is executing the shut off procedure.

In the methods for shutting off the projector according to the present invention, the projector operates under cooling mode after receiving the first shut down command. Additionally, under the cooling mode, the temperature of the projector is lowered to a reference temperature between a re-lighting temperature and an operating temperature. The temperature of the projector is not lowered to below the re-lighting temperature. Therefore, the time needed for shutting off the projector can be shortened effectively and the projector can be stored rapidly after disconnecting the power source.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for shutting off a projector having a fan and a light source, comprising:

lowering a power of the light source from a first power to a second power and increasing a speed of the fan from a first speed to a second speed after the projector receiving a first shut down command; and executing a process adapted to turning off the light source and the fan after the projector receiving a second shut down command.

2. The method as claimed in claim 1, wherein the power of the light source is lowered from the first power to the second power and simultaneously the speed of the fan is increased from the first speed to the second speed after the projector receiving the first shut down command.

3. The method as claimed in claim 1, wherein the power of the light source is lowered from the first power to the second power and sequentially the speed of the fan is increased from the first speed to the second speed after the projector receiving the first shut down command.

4. The method as claimed in claim 1, wherein the speed of the fan is increased from the first speed to the second speed and sequentially the power of the light source is lowered from the first power to the second power after the projector receiving the first shut down command.

5. The method as claimed in claim 1, wherein the process comprises: judging whether a temperature of the projector is lower than and equal to a reference temperature so as to determine whether the fan runs.

6. The method as claimed in claim 5, wherein the reference temperature is between a re-lighting temperature of the light source and an operating temperature of the light source.

7. The method as claimed in claim 1, wherein the process comprises: playing a time-calculating image through the projector to show the time needed for shutting off.

8. The method as claimed in claim 1, wherein the process comprises: playing a shut down image through the projector.

9. A method for shutting off a projector having a fan and a light source, comprising:

lowering a power of the light source from a first power to a second power or increasing a speed of the fan from a first speed to a second speed after the projector receiving a first shut down command; and executing a process adapted to turn off the light source and the fan after the projector receiving a second shut down command.

10. The method as claimed in claim 9, wherein the process comprises: judging whether a temperature of the projector is lower than or equal to a reference temperature so as to determine whether the fan runs.

11. The method as claimed in claim 9, wherein the process comprises: playing a time-calculating image through the projector to show the time needed for shutting off.

12. The method as claimed in claim 9, wherein the process comprises: playing a shut down image through the projector.

* * * * *